INVENTOR.
WALLACE H. DU SHANE

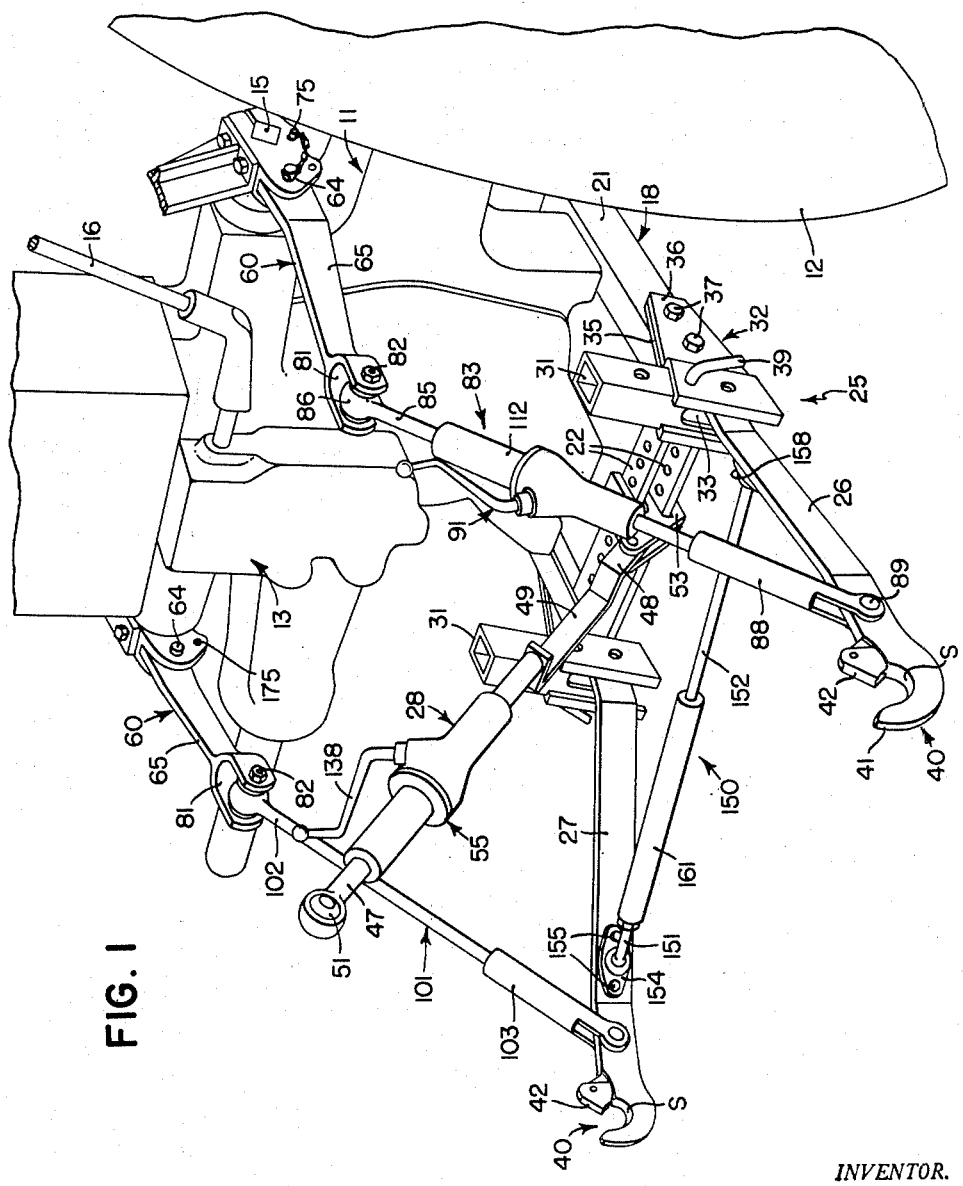

INVENTOR.
WALLACE H. DU SHANE
ATTORNEYS

Dec. 25, 1956 W. H. DU SHANE 2,775,180
HITCH DEVICE
Filed May 31, 1952 4 Sheets-Sheet 4
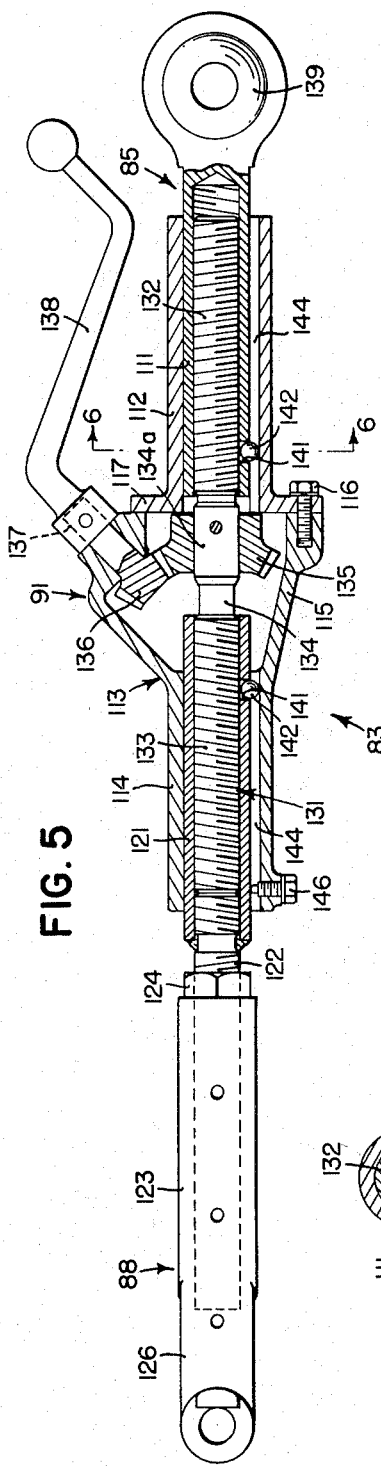
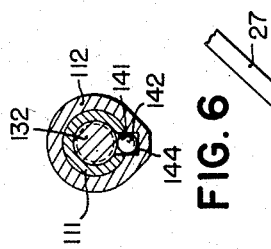
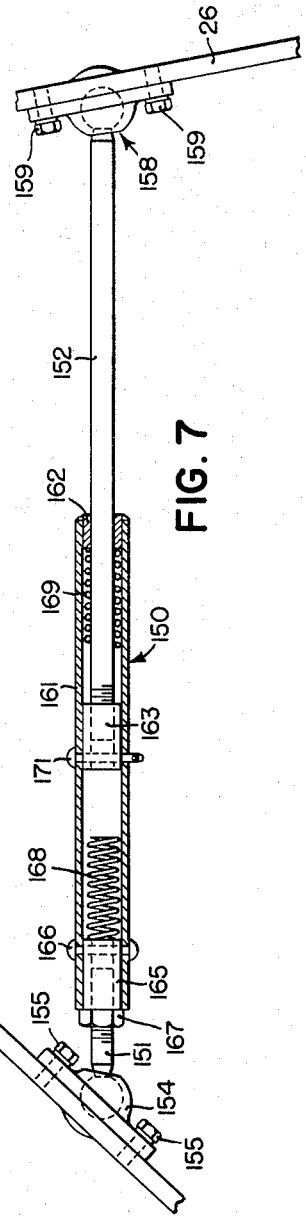
INVENTOR.
WALLACE H. DU SHANE
ATTORNEYS

United States Patent Office 2,775,180
Patented Dec. 25, 1956

2,775,180

HITCH DEVICE

Wallace H. Du Shane, Waterloo, Iowa, assignor to Deere Manufacturing Co., Dubuque, Iowa, a corporation of Iowa Application May 31, 1952, Serial No. 290,916

6 Claims. (Cl. 97—47.58)

The present invention relates generally to agricultural implements and more particularly to hitch devices and the like for connecting implements to a farm tractor. More particularly, the present invention is concerned with hitch devices of the type in which the implement is supported and controlled entirely from the tractor.

The object and general nature of the present invention is the provision of a hitch device especially constructed and arranged so that the implement, particularly a ground-working implement, follows substantially the level of the ground at all times, especially when the outfit passes over ridges, through swales, and the like. Under many conditions of operation, such as in plowing, where the plow is carried at the rear of a tractor, when the outfit passes through shallow depressions, the front end of the tractor begins moving up the slope at the far side of the depression while the plow is still in the ground at the other side of the depression, and therefore it is a specific feature of the present invention to provide a hitch arrangement in which the plow, or other implement, continues to move downwardly as it moves toward and into the depression or swale, even though the front end of the tractor has already started up the far side. Likewise, the hitch device of the present invention is so constructed and arranged that when the outfit passes over the crest of a low ridge or the like, the plow continues to move up the slope toward the upper portion of the ridge even though at that moment the front portion of the tractor has passed the crest of the ridge and has started down on the far side. Thus, the hitch device of the present invention is admirably adapted for such uses as plowing and the like in which the plow is constrained to maintain a substantially constant depth of operation while the outfit as a whole travels over undulating ground, such as through swales or relatively low depressions, over ridges or rises in the ground, or the like.

Another important feature of the present invention is the provision of a hitch device in which upper and lower implement-receiving links are provided, these links being arranged to have lateral flexibility, with means for limiting or preventing such flexibility, when desired. More particularly, the motion-limiting and -preventing means includes cushioning means whereby, such as in transport, the stopping or termination of the lateral movement of the implement does not impose shock loads at any appreciable magnitude on the tractor or the hitch parts. Further, it is a feature of this invention to provide means whereby the hitch of the present invention may be arranged either to accommodate or to prevent lateral tilting of the implement relative to the tractor. For example, relatively wide implements, such as three- and four-row bedders, disk harrows of substantial widths, and the like, require hitch connections so constructed and arranged that the implements can tilt laterally relative to the tractor so as to follow uneven ground, but in other conditions it may be desired to prevent the implement from tilting laterally relative to the tractor, in which case the position of the tractor controls the lateral position of the implement. The hitch device of the present invention is especially constructed to meet these requirements by provision of means whereby the two lift arms of the hitch mechanism are provided with means adapted, optionally, either to be locked to the power lift rockshaft or to permit a limited amount of independent movement of the lift arms relative to the rockshaft. Preferably, according to another feature of the present invention, such means is so constructed and arranged as to provide an overload release whereby, when necessary, implements connected with the tractor so as to rock laterally therewith, may be released to rock relative to the tractor when encountering an obstruction or some other abnormal condition.

These and other objects and advantages of the present invention will be apparent to those skilled in the art after a consideration of the following detailed description, taken in conjunction with the accompanying drawings, in which:

Figure 1 is a perspective view of a hitch device constructed according to the principles of the present invention, showing the same as connected with the rear portion of a wheel tractor of generally conventional construction.

Figure 5 is a detail sectional view of the right-hand adjusting link.

Figure 6 is a sectional view taken along the line 6—6 of Figure 5.

Figure 7 is a detail sectional view of the angle brace for the hitch links.

Figure 8:
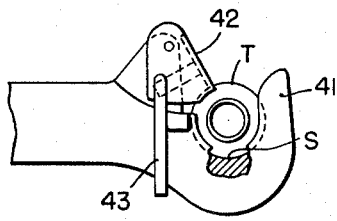
Figure 8 is a fragmentary detail view of the latch means carried at the rear end of each of the draft links.

Referring now to the drawings, the tractor is indicated in its entirety by the reference numeral 10 and includes a rear axle structure 11 in which axle shafts, carrying rear drive wheels 12, are journaled. The tractor 10 also includes a power lift unit 13 which is of generally conventional construction, so far as the present invention is concerned. The power lift 13 includes a hydraulically operated piston and cylinder unit connected to rock a transverse shaft 15 to which implement lifting and controlling arms or other means may be connected, as desired. The operation of the hydraulic mechanism is under the control of a valve lever 16. The tractor 10 also includes a drawbar support 18 that is made up of a pair of generally fore-and-aft extending drawbar support frame bars 21 securely bolted to the lower central portion of the rear axle structure 11 and connected at their rear ends by a pair of upper and lower crossbars 22.

The hitch device of the present invention includes a pair of laterally spaced apart, generally fore-and-aft extending lower draft links 26 and 27 and an upper or compression link 28, together with suitable lifting and attaching connections. The front end of the lower draft link 26 is connected with the right-hand portion of the tractor drawbar support by a pair of relatively adjustable parts indicated at 31 and 32. The part 31 comprises a hollow generally vertical member having sets of transverse apertures through the side walls and bifurcated at its lower end, as at 33, to receive the forward end of the draft link 26 through a ball and socket type of connection. The second connecting part 32 comprises a pair of bracket members 35 and 36 connected by bolts 37 to the right-hand drawbar frame member 21, the rear end portions of the bracket plates 35 and 36 being shaped to form a vertical channel in which the member 31 is received and is adapted to have vertical movement. The rear portions of the plates are apertured to receive a locking pin 39 which is of the quick-detachable type and is readily removable to permit raising and lowering the part 31, relative to the part 32, so as to raise and lower the point of connection between the front end of the draft link 26 and the tractor. The left-hand draft link 27 is adapted to be connected with the drawbar support frame by parts which are substantially the same as those just described, and hence where such parts appear in the drawings they are indicated by the corresponding reference numerals. Hence further description is unnecessary. By removing the pin 39 and shifting the parts 31 into different vertical positions, the points of connection of the draft links 26 and 27 may be raised or lowered relative to the tractor to provide exactly the correct line of draft for the implement which the hitch device 25 connects to the tractor 10. Also, as can be seen from Figure 1, the parts 31 can be removed from the parts 32, and then reversed and reinserted therein so that the front ends 26 and 27 lie at the upper ends of the parts 31, thereby providing an adjustment.

Each of the rear ends of the draft links 26 and 27 is formed with trunnion-engaging latch means 40, comprising a hook section 41 having a spheroidal ball-receiving socket *s* facing upwardly and closed by a spring-pressed keeper or detent 42 having a handle 43 by which the latch may be opened whenever desired. The hook sections 41 face upwardly, and by backing the tractor into position with the draft links 26 and 27 lowered below the attaching trunnions T of the implement I, the links 26 and 27 may be raised so as to engage the trunnions T and so connect the implement with the tractor. The means for raising and lowering the draft links 26 and 27 will be described later.

The implement I is also adapted to be connected with the tractor by the upper link 28. To this end, the implement I includes an upwardly extending mast or bracket M having an apertured portion to which the rear end of the upper link 28 may be connected. The link member 28 will be described in detail below, but it will suffice for the present to note that the member 28 comprises a pair of relatively adjustable parts 47 and 48, the latter having an offset portion 49 so as to clear the power shaft of an implement of the type that is connected with the tractor and includes mechanism driven by the power take-off shaft of the tractor. The rear end of the link part 47 carries a ball connector 51 adapted to be connected to the upper end of the mast I, as by a quick-detachable pin or the like, and the front end of the upper link part 48 is of similar construction, having a ball type of connection with an attaching part 53 that is adapted to be connected, as by a pin or bolt, to one or both of the cross-bars 22 of the tractor drawbar support 18. It will be noted, particularly from Figure 1, that the point of connection between the front end of the upper link member 28 and the tractor lies substantially at the same level as, and generally midway between, the points of connection between the front ends of the lower draft links 26 and 27 and the tractor-carried attaching parts 32, although there may be some variations when the parts 31 are raised or lowered, or reversed, as compared with the positions they occupy when arranged as shown in Figure 1. The two parts 47 and 48 of the upper link 28 are connected to be manually adjusted by a crank and screw unit indicated in its entirety by the reference numeral 55 and more detailed reference to the same will be made below.

According to the principles of the present invention, a lifting arm unit 60 is adapted to be connected to each end of the transverse power lift rockshaft 15. These lift arm units 60 are of substantially the same construction, except that certain parts may be left-hand or right-hand, as required, and therefore a detailed description of one will suffice. The right-hand lift arm unit 60 includes a bi-furcated clamp 61 having spaced apart sections 62 and 63 which are apertured to receive a pivot pin 64 on which a rearwardly extending arm 65 is pivotally mounted. The forward portion of the lift arm 65 extends forwardly and downwardly, as indicated at 66, beyond the pivot 64 and underlies an abutment portion 67 formed at the forward end of the clamp member 61. The latter is formed with a shaft-receiving socket 69, preferably square in configuration so as to snugly fit the power lift rockshaft of a tractor. The forward portion of the clamp 61 is split, as shown at 71, and a clamping bolt 72 is provided for securely clamping the socket section of the clamp to the rockshaft 15. The side portions of the clamp sections 62 and 63, adjacent the forward end of the clamp member 61, are apertured, as at 74, to receive a frangible member in the form of a break pin 75. This pin extends, not only through the apertures 74, but also through an aperture 77 in the forward portion of the lift arm 65 that underlies the abutment section 67 of the clamp 61. A chain 78 connects the pin 75 to the outer end of the lift arm pivot member 64, whereby the parts ordinarily do not become separated. The rear end of the lift arm 65 is bifurcated, as at 81, to receive a pivot member 82 by which the upper end of a lift link member 83 may be connected with the lift arm unit 60. The lift arm unit 83 includes an upper section 85 carrying a ball connector 86 apertured to receive the pivot 82, and a lower part 88 bifurcated to embrace the associated lower draft link 26 and apertured to receive a ball-type connector 89. The two parts are adjustably connected by a crank screw unit 91 by which the effective length of the right-hand lifting link 83 may be adjusted as desired.

The left-hand lift arm unit 60 is connected with the left-hand lower draft link 27 by lifting link means which may be substantially like the lift link 83 described above but, if desired, the adjusting mechanism 91 may be omitted. Therefore, as shown in Figure 1, the left-hand lifting link means includes a link member 101 having upper and lower parts 102 and 103 rigidly interconnected and each having a ball-type of connection with the left-hand lift arm unit 60 and the left-hand lower draft link 27.

Referring now to Figure 5, the right-hand adjustable lift link means 83 is constructed as follows. The upper link member 85 includes a lower tubular interiorly threaded section 111 disposed slidably within the upper tubular portion 112 of a crank screw housing 113. The latter includes a second tubular section 114 which is enlarged, as at 115, and provided with means, such as cap screws 116, by which the flanged portion of the upper tubular section 112 may be rigidly connected with the lower section 114. The upper portion of the lower link member 88 is also formed as a tubular member 121 and is likewise interiorly threaded. The lower tubular section 121 is fixed, as by welding, to a threaded rod section 122 that extends into a tubular portion 123 to the upper end of which a nut member 124, receiving the threaded rod 122, is fixed. The lower end of the tubular link portion 123 is bifurcated, as at 126, to receive the pivot 89 connecting the lower end of the adjustable link unit 83 with the right-hand draft link 26.

The two interiorly threaded tubular sections 111 and 121 are adjustably interconnected by means of a rotatable shaft 131 which includes two axially spaced, screw threaded sections 132 and 133 separated by a reduced portion 134 and a cylindrical portion 134a to which a bevel gear 135 is fixed. The bevel gear 135 lies within the housing portion 115, in which a pinion 136 is also journaled for rotation, the shank portion 137 of the pinion 136 extending outwardly of the housing 113 and receiving the hub of an operating handle or crank 138. The upper end of the link member 85 carries a ball section 139 apertured to receive the pivot 82. Also, each of the tubular sections 111 and 121 is provided with an aperture 141 in which a ball 142 is disposed. The balls 142 are larger in diameter than the thickness of the associated tubular sections so that a portion of each of the balls 142 extends laterally outwardly of the associated tubular section. For receiving the balls 142, each of the housing sections 112 and 114 is provided with a longitudinally extending groove 144 shaped to snugly embrace the portion of the associated ball 142 extending outwardly of the tubular section carrying the ball. Since the two housing sections 112 and 114 are rigidly interconnected, as by the cap screws 116, the two link members 85 and 88 are thus restrained against relative rotation but permitted to have axial displacement one with respect to the other when the crank 138 is turned to rotate the bevel gear 135. The threaded portions 132 and 133 of the shaft 131 are of opposite hand, whereby turning the crank 138 serves to extend or retract the link members 85 and 88. By removing the pivot 89, and loosening the lock nut 124, the section 123 may be adjusted relative to the lower end of the shaft 131 to accommodate changing the length of the link 83 independently of the variation in length provided by the hand crank 138 and associated parts.

The adjusting unit 55 of the upper link 28 may be substantially like the adjusting unit 91 just described, and hence further description is believed to be unnecessary. By turning the crank 138 on the upper compression link 28, the effective length of the latter may be adjusted, as desired, as when changing the pitch or fore-and-aft tilting of the associated implement I. A screw-threaded stud 146 at the lower end of the tubular section 114 extends into the groove 144 and is in a position to engage the lower ball 142 to limit the extension of the two link parts 85 and 88.

The right- and left-hand draft links 26 and 27 are interconnected by means of a transversely extending limited and cushioning brace member 150. Referring now to Figure 7, the unit 150 comprises a short rod 151 and a long rod 152, each having a ball end. The short rod 151 is connected to the left-hand draft link 27 by means of a socket bracket 154 fixed, as by cap screws 155, to the left-hand draft link 27 adjacent its rear end. The ball end of the long rod 152 is connected by a socket bracket 158 to the right-hand draft link 26 adjacent its forward end. The socket bracket 158 is substantially identical to the socket bracket 154 and is secured to the forward end of the draft link 26 by cap screws 159 or the like. The cushioning and motion-limiting brace member 150 also includes a tubular body section 161 which, at its right end, carries a bushing 162 welded to the sleeve 161. The bushing 162 is hollow and slidably receives the inner end of the rod section 152. Secured to the innermost portion of the rod section 152 is an inner sleeve section 163 having an adjustable screw-threaded connection with the innermost end of the rod section 152. At the other end the sleeve 161 carries a bushing 165 fixedly secured in place, as by a rivet 166. The interior of the bushing 165 is screw-threaded and threadedly receives the inner end of the short rod section 151. A lock nut 167 locks the rod section 151 in adjusted position. A compression spring 168 is disposed within the sleeve or body section 161 adjacent the bushing 165, and a similar compression spring 169 is disposed within the other end of the sleeve 161 adjacent the forward bushing 162. The inner sleeve section 163, connected to the inner end of the rod section 152, serves as an abutment engaging one or the other of the springs 168 and 169 when the draft links 26 and 27 are permitted to swing laterally. The springs 168 and 169 are of such length that, as best shown in Figure 7, the rod section 152 is capable of free movement relative to the sleeve section 161 through a substantial distance, but further extension or retraction of the two parts 152 and 161 results in the bushing 163 engaging one or the like of the springs 168 and 169, which are of substantial strength and which cushion the further relative movement between the parts 152 and 161. If it should be desired to lock the parts 152 and 161 against any relative movement, a pin 171 may be inserted through openings in the sleeve 161 and in one end of the abutment bushing 163, thereby locking the parts so as to restrain any lateral swinging of the draft links 26 and 27. However, the pin 171 is so constructed that it will break if the implement is submitted to abnormally laterally directed forces.

The operation of the hitch device of the present invention is substantially as follows.

Figure 2:
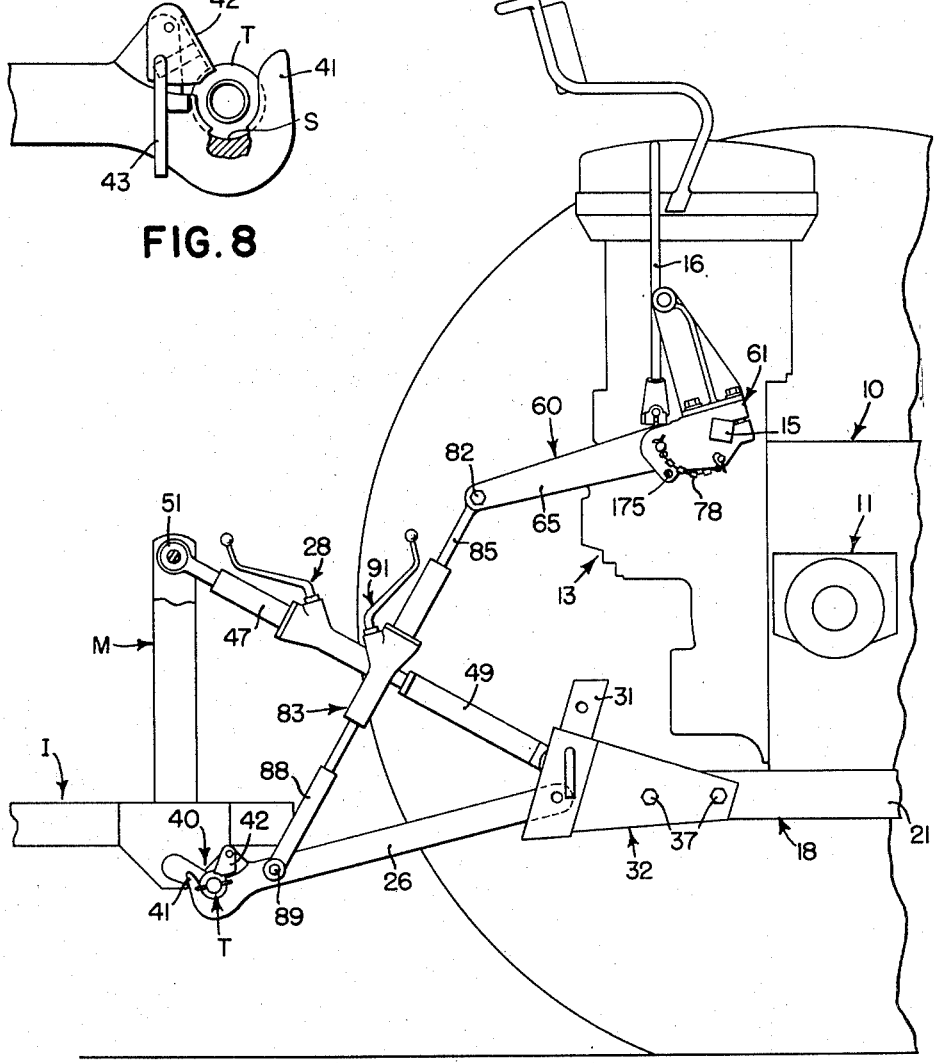
Figure 2 is a side view of the hitch device shown in Figure 1.
Figure 3:
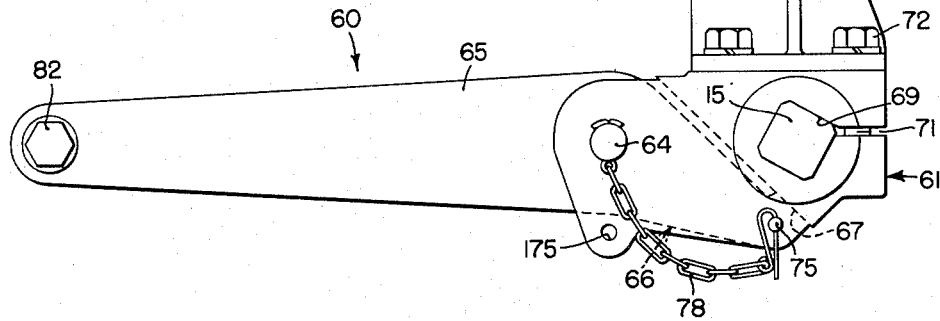
Figure 3 is an enlarged side view of one of the lifting arms and associated parts.
Figure 4:
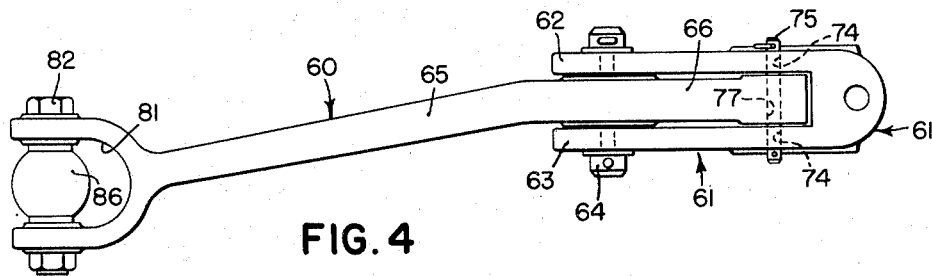
Figure 4 is a top view of the construction shown in Figure 3.

Figure 2 shows the hitch device of the present invention as connecting a two-bottom moldboard plow with a farm tractor. For implements of this kind, field experience has shown that the draft link connecting parts 31 should be raised so that the points of pivotal connection of the draft links 26 and 27 are substantially adjacent or in line with the pivot connection of the upper link 28 with the attaching bracket 53 on the tractor drawbar support. This provides a virtual hitch point which is disposed rearwardly of the vertical transverse plane of the axes of the drive wheels, and therefore when the front wheels of the tractor move downwardly, as when entering a swale or the like, the plow is pitched or tilted upwardly only a slight amount, relative to the tractor so that as a result the plow remains at substantially the same operating depth relative to the surface of the ground as when operating in a substantially level position. Conversely, if the front end of the tractor should be moved upwardly, as when starting up to the slope of a ridge or the like, the plow is pitched or tilted downwardly only slightly, relative to the tractor, so that again the depth of operation of the plow remains substantially constant. In other words, when the tractor starts up the slope of a ridge or the like, this plow is not pulled out of the ground, and similarly, when the front end of the tractor moves downwardly when entering a swale or the like, the plow is not pulled too deep into the ground. Generally speaking, a hitch device of the present invention maintains a substantially constant depth of plowing even though the tractor passes into and out of swales and up and down over ridges and the like, the slopes of which are as long or longer than the tractor and plow outfit. On the other hand, when the front wheels of the tractor pass over relatively short ridges or ditches, such as dead furrows, and the like, the corresponding changes in the pitch of the plow are of such momentary character that the depth of plowing is not materially altered, largely because of the short duration of such pitch changes.

When the hitch device of the present invention is used for connecting such implements as plows or the like to the tractor, it is generally desirable to have both lift arm pins 75 in their arm-locking position, whereby the lateral level of the plow or the implement may be determined by or gauged from the tractor. On the other hand, when relatively wide implements are connected to the tractor, it is generally desirable to remove the pins 75 so as to permit the implement to follow the surface of the ground independently of the position of the tractor. Each of the lifting arm clamps 61 carries a lower apertured portion 175 in which the associated pin 75 may be disposed when it is not desired to lock the arm 65 to its clamp member 61. Also, for implements which should not be permitted to swing laterally relative to the tractor, the locking pin 171 may be inserted in the sway link or brace unit 150, so as to hold the draft links 26 and 27 against lateral swinging relative to the tractor. When such lateral swinging is desired, the pin 171 may be removed and under these conditions the lateral swinging of the implement relative to the tractor is cushioned by the springs 158 and 169. The trunnion-engaging latch means 40 are arranged so that the sockets s face upwardly. Thus, when connecting an implement to the tractor, it is relatively easy to back the tractor into position with the arms 26 lower than the associated trunnions T of the implement to be connected, and then by simply actuating the tractor power lift rockshaft to raise the hook sections 40 into engagement with the associated implement trunnion means the implement-tractor connection may be completed by connecting the end 51 of the upper link member 28 to the upper portion of the mast of the implement.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters patent is:

1. A hitch device for connecting an argricultural implement with a tractor of the type having front and rear wheels and a power lift including a pair of generally vertically swingable lift arms, said hitch device comprising a pair of lower draft links, an upper compression link, each of said links having means at their rear ends to receive said implement, means for connecting said lift arms with said lower links, means adapter to be fixed to the tractor for pivotally receiving the forward ends of said lower links, said link-receiving means being vertically adjustable, relative to the tractor, between upper and lower positions, and means adapted to be fixed to the tractor for pivotally receiving the forward end of said upper link and for connecting the latter to the tractor at a point disposed vertically between the levels of said upper and lower positions.

2. A hitch device for connecting an argricultural implement with a tractor of the type having front and rear wheels and a power lift including a pair of generally vertically swingable lift arms, said hitch device comprising a pair of lower draft links, an upper compression link, each of said links having means at their rear ends to receive said implement, means for connecting said lift arms with said lower links, means adapted to be fixed to the tractor for pivotally receiving the forward ends of said lower links thereto, said link-receiving means being vertically adjustable relative to the tractor, means adapted to be fixed to the tractor for pivotally receiving the forward end of said upper link, and lateral swing limiting means connected between said lower links and movable vertically with the latter when the front ends thereof are adjusted vertically relative to the tractor, said swing limiting means comprising a pair of relatively movable parts freely shiftable, one relative to the other, through a limited distance, and cushioned means limiting said relative movement to said limited distance.

3. The invention set forth in claim 2, further characterized by frangible locking means optionally locking said relatively movable parts against relative movement.

4. A hitch device for connecting an agricultural implement with a tractor of the type having a power actuated transverse rockshaft, said hitch device comprising a pair of lower draft links, an upper compression link, each of said links having means at their rear ends to receive said implement, means adapted to be fixed to the tractor for pivotally receiving the forward ends of said links, lift links extending upwardly from said lower links, and a pair of lift arms adapted to be connected with said rockshaft and connected with the upper ends of said lift links, each of said lift arms including a bifurcated member having spaced apart sections, apertured at fore-and-aft spaced points, and an abutment portion disposed therebetween, and a generally fore-and-aft extending arm having a forward end engageable with said abutment portion and apertured at fore-and-aft spaced points corresponding to the above mentioned points, a pivot member located in the rear set of apertures for pivotally connecting each arm with the associated bifurcated member, and removable means insertable through the forward set of apertures for optionally locking said arm and bifurcated member together.

5. A hitch device for connecting an agricultural implement with a tractor of the type having front and rear wheels and a power lift including a pair of generally vertically swingable lift arms, said hitch device comprising a pair of lower draft links, an upper compression link, each of said links having means at their rear ends to receive said implement, means for connecting said lift arms with said lower links, means adapted to be fixed to the tractor for pivotally receiving the forward ends of said lower links thereto, said link-receiving means accommodating lateral movement of said lower links relative to the tractor, means adapted to be fixed to the tractor for pivotally receiving the forward end of said upper link and also accommodating lateral swinging of said upper link relative to the tractor, and lateral swing limiting means connected between said lower links, said swing limiting means comprising a pair of relatively movable parts freely shiftable, one relative to the other, through a limited distance, and cushioned means limiting said relative movement to said limited distance.

6. A hitch device for connecting an agricultural implement with a tractor of the type having a power actuated transverse rockshaft, said hitch device comprising a pair of lower draft links, each of said links having means at their rear ends to receive said implement, means adapted to be fixed to the tractor for pivotally receiving the forward ends of said links, lift links extending upwardly from said lower links, and a pair of lift arms adapted to be connected with said rockshaft and connected with the upper ends of said lift links, each of said lift arms including a bifurcated member having spaced apart sections, apertured at fore-and-aft spaced points, and an abutment portion disposed therebetween, and a generally fore-and-aft extending arm having a forward end engageable with said abutment portion and apertured at fore-and-aft spaced points corresponding to the above mentioned points, a pivot member located in the rear set of apertures for pivotally connecting each arm with the associated bifurcated member, and removable means insertable through the forward set of apertures for optionally locking said arm and bifurcated member together.

References Cited in the file of this patent

UNITED STATES PATENTS

| 1,043,277 | Weaver | Nov. 5, 1912 |
| 2,118,180 | Ferguson | May 24, 1938 |
| 2,210,907 | Erickson | Aug. 13, 1940 |
| 2,309,750 | Carrington | Feb. 2, 1943 |
| 2,324,840 | Hipple | July 20, 1943 |
| 2,350,880 | Dellinger et al. | June 6, 1944 |
| 2,375,970 | Williams | May 15, 1945 |
| 2,379,469 | Bagan | July 3, 1945 |
| 2,438,553 | Fraga | Mar. 30, 1948 |
| 2,445,145 | Love | July 13, 1948 |
| 2,453,390 | Werner | Nov. 9, 1948 |
| 2,497,319 | Mott | Feb. 14, 1950 |
| 2,518,215 | Wright | Aug. 8, 1950 |
| 2,601,640 | Simmons | June 24, 1952 |
| 2,611,304 | Toland | Sept. 23, 1952 |
| 2,674,171 | Metz et al. | Apr. 6, 1954 |

FOREIGN PATENTS

| 614,653 | Great Britain | Dec. 20, 1948 |
| 647,622 | Great Britain | Dec. 20, 1950 |